United States Patent
Tsai et al.

(10) Patent No.: US 8,730,634 B2
(45) Date of Patent: May 20, 2014

(54) ESD PROTECTION CIRCUIT

(75) Inventors: Chia-Ku Tsai, New Taipei (TW); Fu-Yi Tsai, Hsinchu (TW); Yan-Hua Peng, Hsinchu (TW)

(73) Assignee: Faraday Technology Corp., Science-Based Industrial Park, Hsin-Chu (TW)

( * ) Notice: Subject to any disclaimer, the term of this patent is extended or adjusted under 35 U.S.C. 154(b) by 145 days.

(21) Appl. No.: 13/437,262

(22) Filed: Apr. 2, 2012

(65) Prior Publication Data

US 2012/0275073 A1    Nov. 1, 2012

(30) Foreign Application Priority Data

Apr. 29, 2011   (TW) .............................. 100115270 A

(51) Int. Cl.
*H02H 3/22*   (2006.01)

(52) U.S. Cl.
USPC .............................. 361/91.1; 361/56; 361/111

(58) Field of Classification Search
CPC ....... H02H 9/041; H02H 3/22; H01L 27/0248
USPC .......................................... 361/56, 91.1, 111
See application file for complete search history.

(56) References Cited

U.S. PATENT DOCUMENTS

| | | | | |
|---|---|---|---|---|
| 5,400,202 | A * | 3/1995 | Metz et al. | 361/56 |
| 5,504,451 | A * | 4/1996 | Smayling et al. | 327/438 |
| 5,734,541 | A * | 3/1998 | Iniewski et al. | 361/111 |
| 5,825,600 | A * | 10/1998 | Watt | 361/56 |
| 6,157,530 | A * | 12/2000 | Pequignot et al. | 361/111 |
| 6,188,267 | B1 * | 2/2001 | Sanchez et al. | 327/438 |
| 6,573,566 | B2 * | 6/2003 | Ker et al. | 257/355 |
| 6,768,616 | B2 * | 7/2004 | Mergens et al. | 361/56 |
| 7,411,767 | B2 * | 8/2008 | Huang et al. | 361/56 |
| 7,589,944 | B2 | 9/2009 | Mergens et al. | |
| 8,077,440 | B2 * | 12/2011 | Krabbenborg et al. | 361/56 |
| 2002/0130366 | A1 | 9/2002 | Morishita | |
| 2007/0096213 | A1 | 5/2007 | Tsai et al. | |
| 2009/0268359 | A1 | 10/2009 | Chatty et al. | |
| 2010/0027173 | A1 | 2/2010 | Wijmeersch | |
| 2010/0118454 | A1 | 5/2010 | Ker et al. | |

OTHER PUBLICATIONS

Russ et, al., "GGSCRs: GGNMOS Triggered Silicon Controlled Rectifiers for ESD Protection in Deep Sub-Micron CMOS Processes", 2001, ESD Association and Sarnoff Corporation, New York.

* cited by examiner

*Primary Examiner* — Rexford Barnie
*Assistant Examiner* — Zeev V Kitov
(74) *Attorney, Agent, or Firm* — Winston Hsu; Scott Margo

(57) ABSTRACT

Electrostatic discharge (ESD) protection circuit including a first silicon controlled rectifier (SCR) and a trigger circuit; the trigger circuit including a first MOS transistor and a second transistor, triggering the first SCR and providing a second SCR shunt with the first SCR during ESD.

14 Claims, 10 Drawing Sheets

ESD PROTECTION CIRCUIT

This application claims the benefit of Taiwan application Serial No. 100115270, filed on Apr. 29, 2011, the subject matter of which is incorporated herein by reference.

FIELD OF THE INVENTION

The present invention relates to an electrostatic discharge (ESD) protection circuit, and more particularly, to an ESD protection circuit based on silicon controlled rectifier (SCR).

BACKGROUND OF THE INVENTION

Chips and/or Integrated circuits are the most essential hardware foundation of the modern information society. To exchange signals with external circuits, a chip includes input/output (IO) pads; to drain supply power for operation, the chip is also equipped with supply pads, such as power pads and ground pads respectively coupled to power voltage(s) and ground voltage(s). However, ESD of high voltage also conducts to internal circuits of a chip through pads of the chip; to prevent the internal circuits from damages of ESD, a chip needs to include ESD protection circuits. An ESD protection circuit provides a conduction path for discharging ESD current when ESD occurs, so the large ESD current will not jeopardize internal circuits of a chip.

Among various techniques of ESD protection, one kind of ESD protection technique is based on SCR. For a given layout area, an SCR conducts more current than other kinds of semiconductor devices, and high capability of current conduction is one of important demands for ESD protection. However, there are many problems to be overcome for SCR-based ESD protection. For example, an SCR needs to be triggered by a higher trigger voltage, and suffers a lower holding voltage; as the trigger voltage is high, the SCR can not quickly respond ESD events. After an SCR is turned on, it keeps conducting if the voltage applied to the SCR is higher than the holding voltage; as the holding voltage is low, the SCR conducts during normal operation of the chip, and hence affects operation of other internal circuits inside the chip.

Prior SCR-based ESD protection techniques can be briefly described as follows. In a prior art, such as the article "GGSCRs: GGNMOS Triggered silicon controlled rectifiers for ESD protection in deep sub-micron CMOS processes", Electrical Overstress/Electrostatic Discharge Symposium, 2001 by Russ et al., an SCR cooperates with a gate-grounded metal-oxide-semiconductor (MOS) transistor to lower the trigger voltage. Furthermore, SCR-based ESD protection techniques are also mentioned in U.S. patent/application such as U.S. Pat. No. 7,589,994, US2002/0130366, US2007/0096213, US2009/0268359 and US2010/0027173, etc.

SUMMARY OF THE INVENTION

To improve SCR-based ESD protection technique, the invention provides an SCR-based ESD protection in cooperating with a trigger circuit; the trigger circuit speeds up triggering of SCR, and further provides a parasitic shunt SCR to contribute more current conduction capability during ESD events.

An objective of the invention is to provide an ESD protection circuit includes a first SCR and a trigger circuit. The first SCR has a first coupling terminal, a second coupling terminal and a control terminal; the first coupling terminal and the second coupling terminal are respectively coupled to an anode terminal and a cathode terminal. The trigger circuit includes a first MOS transistor and a second transistor. The first MOS transistor has a first node, a second node and a third node; the first node and the third node are respectively coupled to the control terminal and the second coupling terminal. The second transistor has a fourth node and a fifth node; the fourth node is coupled to the anode terminal, and the fifth node is coupled to the second node. The first MOS transistor and the second transistor provide a second SCR between the first coupling terminal and the second coupling terminal.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

Figure 1:
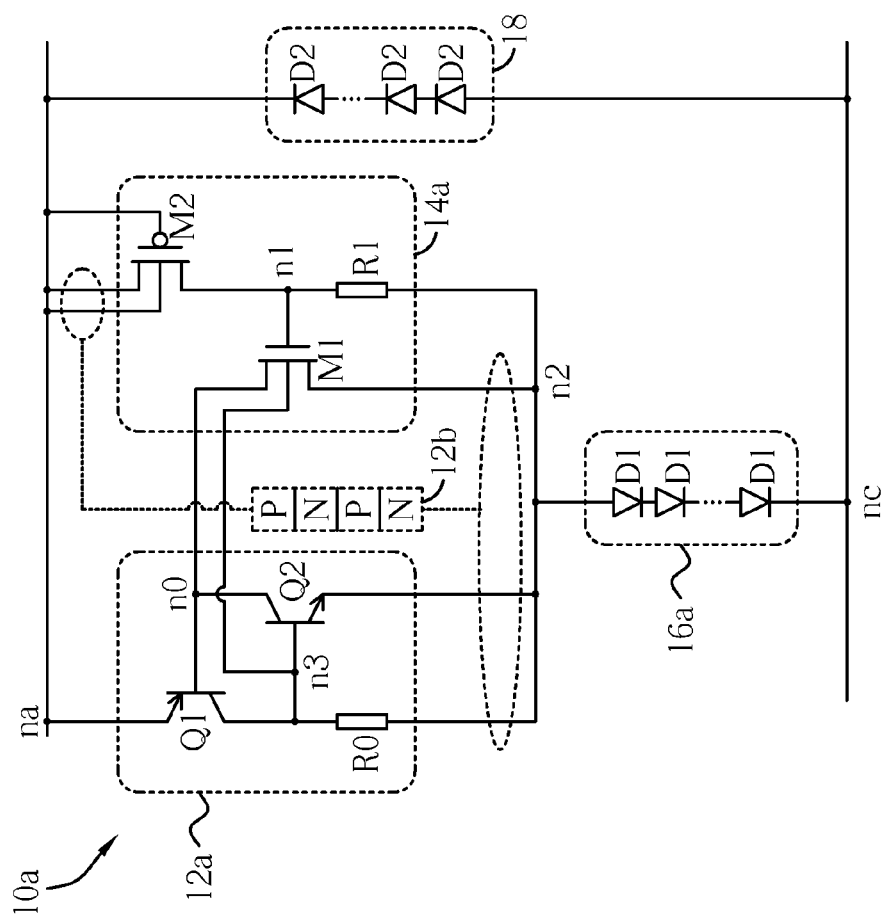
FIG. 1 illustrates an ESD protection circuit according to an embodiment of the invention.

Please refer to FIG. 1 illustrating an ESD protection circuit 10a according to an embodiment of the invention. The ESD protection circuit 10a includes an SCR 12a, a trigger circuit 14a and two optional serial circuits 16a and 18. Nodes na and nc respectively work as an anode terminal and a cathode terminal of the ESD circuit 10a; nodes na and n2 are two coupling terminals of the SCR 12a, and the node n2 is coupled to the node nc through the serial circuit 16a. A node n0 can be regarded as a control terminal of the SCR 12a. In this embodiment, the SCR 12a is formed by two transistors Q1 and Q2, and a resistor R0. The transistor Q1 can be an NPN bipolar junction transistor with an emitter, a base and a collector respectively coupled to the nodes na, n0 and n3. The transistor Q2 can be a PNP bipolar junction transistor with an emitter, a base and a collector respectively coupled to the nodes n2, n3 and n0. The resistor R0 is coupled between the nodes n2 and n3. Therefore, the transistors Q1 and Q2 form an SCR of alternate PNPN junctions between the nodes na and n2.

In the embodiment of FIG. 1, the trigger circuit 14a includes two transistors M1, M2 and a resistor R1. The transistor M1 can be an N-channel MOS transistor with a drain, a bulk, a source and a gate respectively coupled to the nodes n0, n3, n2 and n1. The transistor M2 can be a P-channel MOS transistor having a drain, a bulk, a source and a gate, the drain is coupled to the node n1, the bulk, the source and the gate are commonly coupled to the node na. The resistor R1 is coupled between the nodes n1 and n2.

Two terminals of the serial circuit 16a are respectively coupled to the nodes n2 and nc. The serial circuit 16a can includes a predetermined number of diodes D1, each diode D1 is serially coupled between the nodes n2 and nc. The serial circuit 16a can exclude any diode D1, i.e., the serial circuit 16a can be omitted, the node n2 can be directly merged to the node nc. The serial circuit 16a can include a single diode D1 with an anode and a cathode respectively coupled to the nodes n2 and nc. The serial circuit 16a can also include a plurality of diodes D1, one of the diodes D1 has an anode coupled to the node n2, another of the diodes D1 has a cathode coupled to the node nc; among the rest diodes D1, each diode D1 has a cathode coupled to an anode of another diode D1.

The serial circuit 18 has two terminals respectively coupled to the nodes na and nc. The serial circuit 18 can include a predetermined number of diodes D2 serially coupled between the node na and nc. The serial circuit 18 can exclude any diode D2; that is, the serial circuit 18 can be omitted. The serial circuit 18 can include only a single diode D2 with an anode and a cathode respectively coupled to the nodes nc and na. In an alternative embodiment, the serial circuit 18 includes a plurality of diodes D2, one of the diodes D2 has an anode coupled to the node nc, another of the diodes D2 has a cathode coupled to the node na; among the rest diodes D2, each diode D2 has a cathode coupled to an anode of another diode D2.

The ESD protection circuit 10a can be installed in a chip to protect internal circuits of the chip. For example, the node na can be coupled to a power pad or a signal 10 pad, and the node nc can be coupled to the ground voltage inside the chip.

Operation of the ESD protection circuit 10a can be described as follows. In the trigger circuit 14a, the transistor M2 provides an equivalent (a parasitic) capacitor between the nodes na and n1, and the transistors M1 and M2 commonly provide a parasitic SCR 12b between the nodes na and n2. When ESD occurs between the nodes na and nc to cause a rapidly rising strong positive voltage at the node na, the high voltage at the node na will be coupled to the node n1 through the capacitor provided by the transistor M2, consequently the voltage at the node n1 follows to rise. Hence, the transistor M1 turns on to drain current from the node n0, the SCR 12a is therefore trigged to turn on and starts to conduct current between the nodes na and n2; at the same time, the SCR 12b also turns on, so the SCR 12a and SCR 12b cooperate to conduct ESD currents from the node na to the node n2 and node nc. Because the SCRs 12a and 12b are parallel-shunt between the nodes na and n2, currents conducted by the two SCRs add together to enhance ESD protection capability and efficiency (ESD current conducted per unit layout area).

On the other hand, when the chip powers on and enters normal operation, the capacitor provided by the transistor M2 causes the voltage at the node n1 to reach the voltage at the node n2, so the transistor M1 turns off to stop conducting, hence the SCRs 12a and 12b also turn off, and thus normal operation of the chip is not affected.

Figure 2:
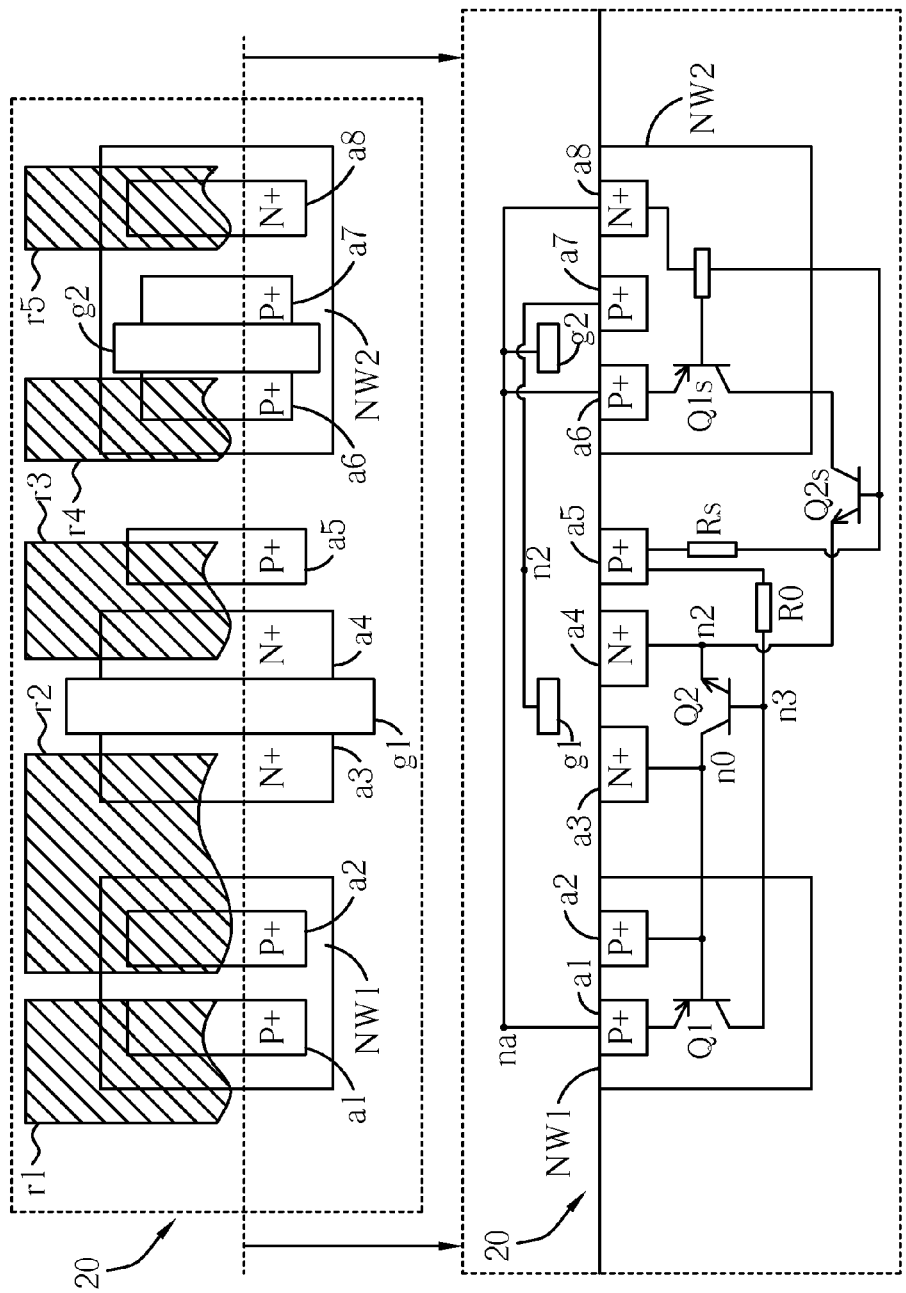
FIG. 2 illustrates a layout of an ESD protection circuit according to an embodiment of the invention.

Formation of the SCR 12b by the trigger circuit 14a can be further explained with FIG. 2 which illustrates a circuit layout 20 and its cross-section for implementing the ESD protection circuit 10a according to an embodiment of the invention. The circuit layout 20 includes two N-wells NW1 and NW2, regions a1 to a8, g1 and g2, as well as conductive routings r1 to r5. The regions a1, a2, a5, a6 and a7 are P+ doped regions; the regions a3, a4 and a8 are N+ doped regions. The regions a1 and a2 are formed in the N-well NW1 to respectively become the emitter and the base of the transistor Q1, and substrate of the circuit layout 20 forms the collector of the transistor Q1. The region a3, a4 and the gate region g1 respectively form the drain, the source and the gate of the transistor M1; the routing r2 conducts between the regions a2 and a3, and the regions a3, a4 and the substrate also form the collector, the emitter and the base of the transistor Q2, respectively. Resistance between the substrate and the region a5 forms the resistor R0; the routing r3 conducts the regions a4 and a5. The regions a6, g2 and a7 respectively form the source, the gate and the drain of the transistor M2.

For the regions a3, a4 and a6, a7 forming the transistors M1 and M2, a parasitic PNP bipolar junction transistor Q2s is formed between the region a4, the substrate and the N-well NW2, and another parasitic NPN bipolar junction transistor Q1s is formed between the region a6, the N-well NW2 and the substrate; resistance between the region a5 and the substrate forms the resistor Rs. The routings r1, r4 and r5 conduct the regions a1, a6 and a8 to the same node na; the regions g1 and a7 are also conducted to the same node n2. Therefore, the transistor Q1s, Q2s and the resistor Rs form the parasitic SCR 12b (FIG. 1).

In other words, the trigger circuit 14a of the invention not only triggers the SCR 12a, but also provides another SCR 12b by itself. When the trigger circuit 14a causes the SCR 12a to turn on, the SCR 12b also turns on together; as the two SCRs are shunt, current conduction capability between the nodes na and n2 is enhanced during ESD protection.

In the ESD protection circuit 10a, the serial circuit 16a can improve the holding voltages of the SCRs 12a/12b, also suppress leakage currents of the SCR 12a and the trigger circuit 14a. In a chip of modern advanced process, because the chip can operate under lower power voltage, even the holding voltage of SCR is lower, incorrect triggering of SCR is rare. Therefore, the serial circuit 16a can be omitted. The serial circuit 18 is adopted to protect positive ESD striking at the node nc; when ESD occurs between the nodes nc and na with a strong positive voltage rising at the node nc against the node na, the diode(s) D2 of the serial circuit 18 will conduct from its anode to cathode, so the ESD current of the node nc can be conducted to the node na.

Figure 3:
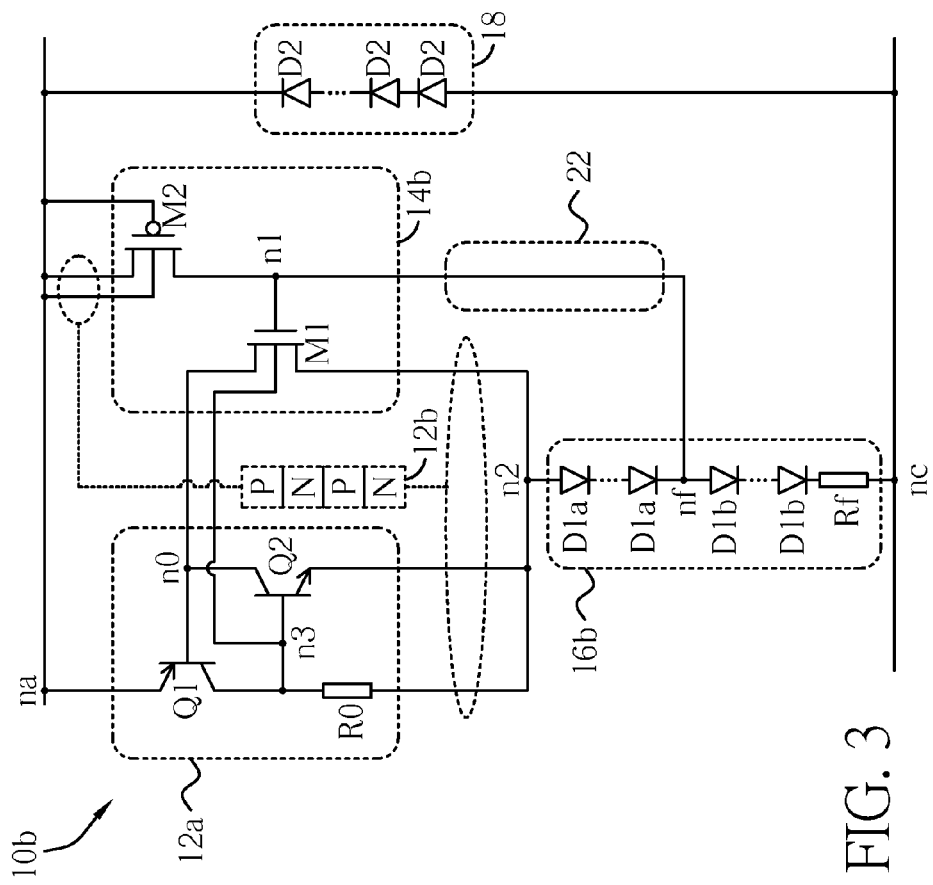
FIG. 3 to FIG. 10 illustrate ESD protection circuits according to different embodiments of the invention.

Please refer to FIG. 3 illustrating an ESD protection circuit 10b according to an embodiment of the invention. The ESD protection circuit 10b includes an SCR 12a, a trigger circuit 14b, serial circuits 16b and 18, and a feedback circuit 22. The trigger circuit 14b includes two transistors M1 and M2; a drain, a bulk, a gate and a source of the transistor M1 are respectively coupled to the nodes n0, n3, n1 and n2; a source, a gate and a bulk of the transistor M2 are commonly coupled to the node na, and a drain of the transistor M2 is coupled to the gate of the transistor M1 at the node n1.

In association with circuit architecture of the trigger circuit 14b, the serial circuit 16b includes a first number of diodes D1a, a second number of diodes D1b and a resistor Rf. An anode and a cathode of each diode D1a are serially coupled between the nodes n2 and nf, an anode and a cathode of each diode D2a are serially coupled between the nodes nf and the resistor Rf; the node nf, as a feedback terminal, is coupled to the node n1 through the feedback circuit 22 (e.g., a wire). The first number can be zero (none), one or multiple; the second number can be zero, one or multiple. The diodes D1a and D2a can be matched diodes, or different diodes.

Similar to the embodiments in FIG. 1 and FIG. 2, in the trigger circuit 14b of FIG. 3, the transistors M1 and M2 also provides a parasitic SCR 12b between the nodes na and n2. When ESD occurs between the nodes na and nc with the voltage at the node na rising, the transistor M2 provides a capacitor between the nodes na and n1, the high voltage of the node na is thus coupled to the node n1, so the transistor M1 turns on to trigger the SCR12a, and hence the SCR 12a turns on also; meanwhile, the SCR 12b turns on, too. Under such arrangement, the SCRs 12a and 12b both conduct ESD currents from the node na to the node n2 for ESD protection.

During ESD, if the capacitor provided by the transistor M2 between the nodes na and n1 is small (of less capacitance), the voltage at the node n1 falls more quickly. However, when the ESD current is conducted to the node nc from the node n2, a voltage is built across the resistor Rf, and is fed back to the node n1, i.e., the gate of the transistor M1, through the node nf. During an interval when ESD continues, the transistor M1 will be kept turning on by the voltage fed back from the node nf, so the SCRs 12a and 12b are also kept conducting.

Figure 4:
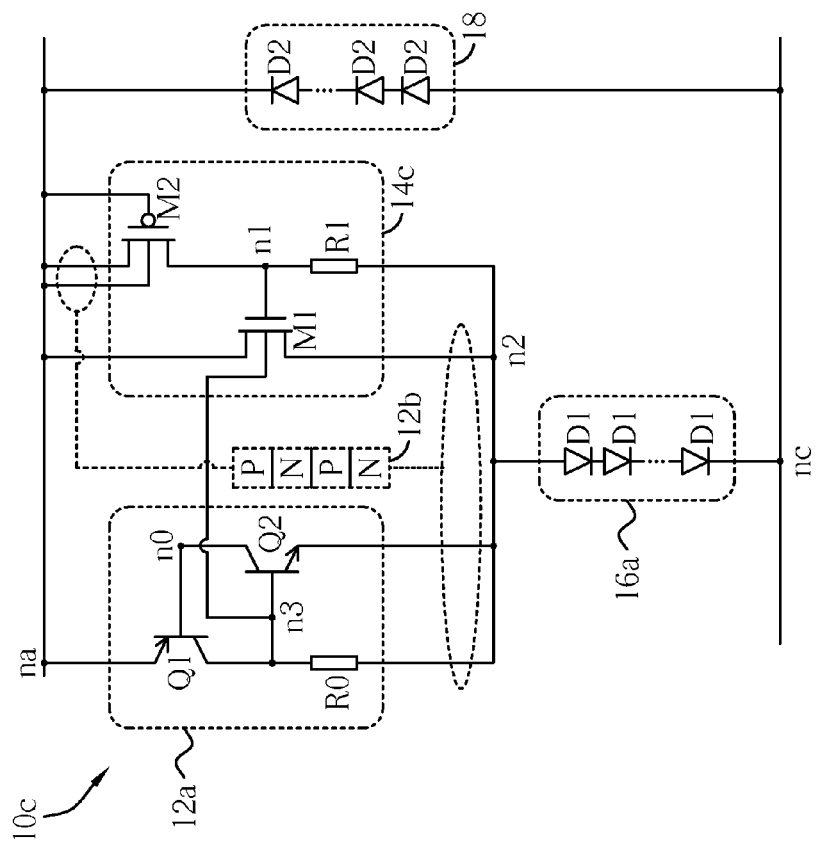

Please refer to FIG. 4 illustrating an ESD protection circuit 10c according to an embodiment of the invention. Similar to the embodiment of FIG. 1, the ESD protection circuit 10c also includes an SCR 12a, a trigger circuit 14c and serial circuits 16a and 18; the trigger circuit 14c also includes two transistors M1, M2 and a resistor R1; the transistor M2 provides a parasitic capacitor between the nodes na and n1, the transistors M1 and M2 also provide another SCR 12b between the nodes na and n2. A difference is that, in the trigger circuit 14c, a drain, a bulk, a gate and a source of the transistor M1 are respectively coupled to the nodes na, n3, n1 and n2. When ESD occurs between the nodes na and nc with a positive voltage striking the node na, the high voltage at the node na is coupled to the node n1 by the transistor M2, such that the transistor M1 turns on; the turned-on transistor M1 will trigger the SCR 12a with a bulk current conducted to a control terminal of the node n3, and thus both the SCRs 12a and 12b conduct ESD currents from the node na to the nodes n2 and nc.

Figure 5:
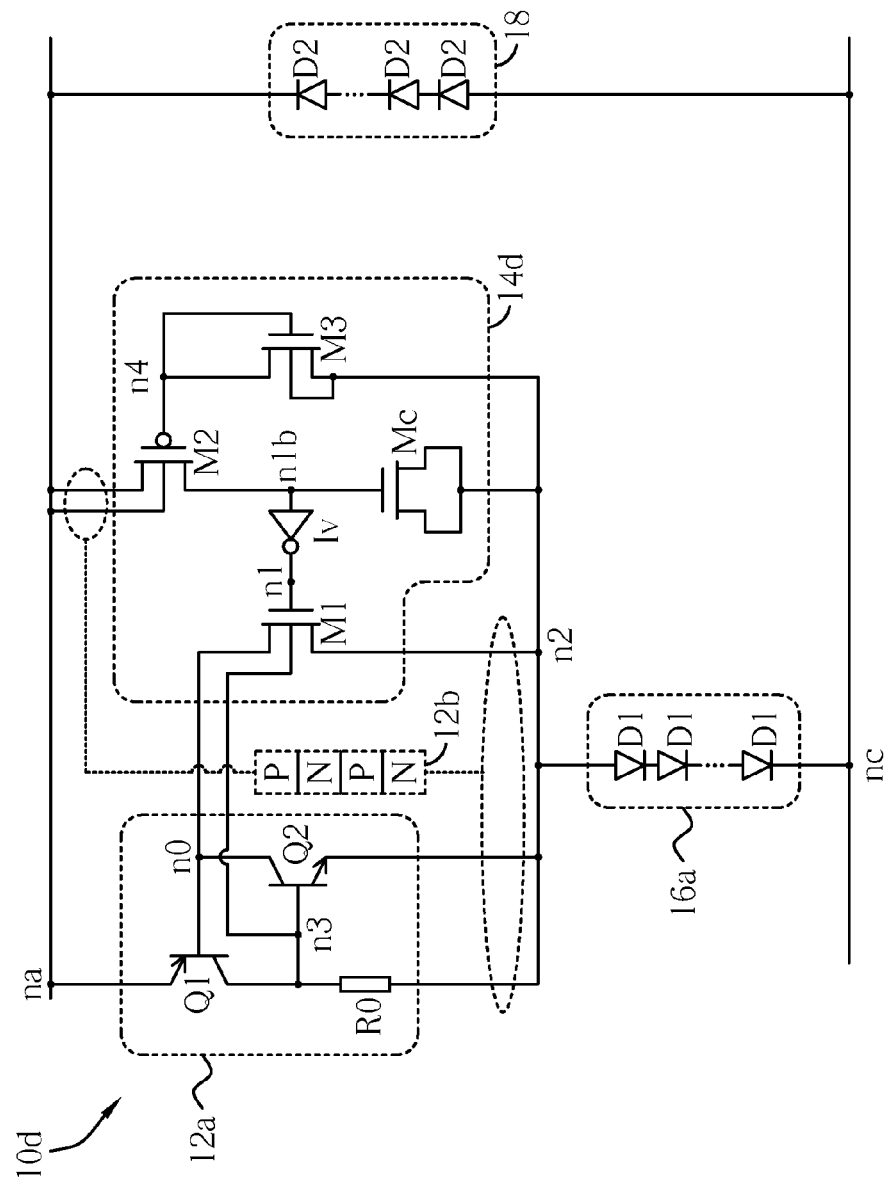

Please refer to FIG. 5 illustrating an ESD protection circuit 10d according to an embodiment of the invention. The ESD protection circuit 10d adopts the SCR 12a, the serial circuits 16a and 18 of the ESD protection circuit 10a, and further includes a trigger circuit 14d. The trigger circuit 14d includes transistors M1, M2, M3, Mc and an inverter Iv. The transistors M1 and M3 can be N-channel MOS transistors; a drain, a bulk, a gate and a source of the transistor M1 are respectively coupled to the nodes n0, n3, n1 and n2, a drain and a gate of the transistor M3 are coupled to a node n4, and a bulk and a source of the transistor M3 are coupled to the node n2. The transistor M2 can be a P-channel MOS transistor with a source and a bulk coupled to the node na, and a gate and a drain respectively coupled to nodes n4 and n1b. Similar to the embodiments of FIG. 1 and FIG. 2, the transistors M1 and M2 also form an SCR 12b between the nodes na and n2; on the other hand, the transistor M2 provides a parasitic resistor between the nodes na and n1b. The transistor Mc can be a MOS transistor which functions as a capacitor coupled between the nodes n1b and n2. A drain and a source of the transistor Mc are coupled together at the node n2 to form one terminal of the capacitor; a gate of the transistor Mc is coupled to the node n1b to form the other terminal of the capacitor. The inverter Iv is coupled between the nodes n1b and n1.

When ESD occurs between the node na and nc with a rising voltage at the node na, a comparatively lower voltage at the node n2 is coupled to the node n1b by the transistor Mc, so the voltage at the node n1b is low; the inverter Iv inverts the low voltage at the node n1b to a high voltage at the node n1, and thus the transistor M1 turns on. The turned-on transistor M1 triggers the SCR 12a to turn on, the SCR 12b also turns on, and the SCRs 12a and 12b cooperate to conduct ESD currents from the node na to the nodes n2 and nc.

Figure 6:
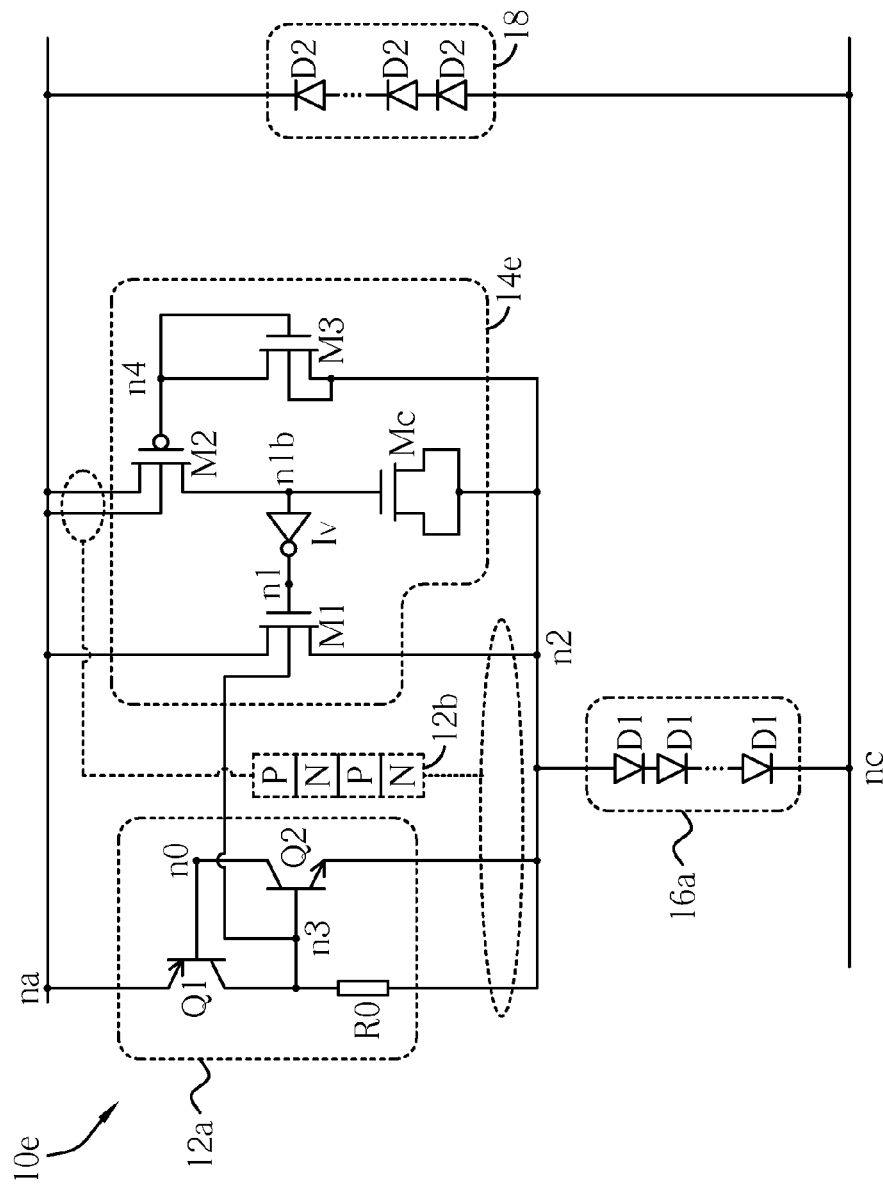

Following the embodiment of FIG. 5, please refer to FIG. 6 illustrating an ESD protection circuit 10e according to an embodiment of the invention; the ESD protection circuit 10e also includes an SCR 12a, a trigger circuit 14e and two serial circuits 16a and 18. Similar to the trigger circuit 14d shown in FIG. 5, the trigger circuit 14e shown in FIG. 6 also includes transistors M1, M2, M3, Mc and an inverter Iv, the transistor M1 and M2 also provides an SCR 12b between the nodes na and n2; a difference is that, a drain of the transistor M1 is coupled to the node na. Operation of the trigger circuit 14e is similar to operation of the trigger circuit 14d, the transistor M2 provides a resistor between the nodes na and n1b, the transistor Mc provides a capacitor between the nodes n1b and n2. When ESD occurs between the nodes na and nc to cause a rapidly rising voltage at the node na, the transistor Mc keeps a low voltage at the node n1b, hence the inverter Iv turns on the transistor M1 by a high voltage at the node n1. The turned-on transistor M1 triggers the SCR 12a with the bulk of the transistor M1; the SCR12b turns on at the same time to conduct ESD current along with the shunt SCR 12a.

Figure 7:
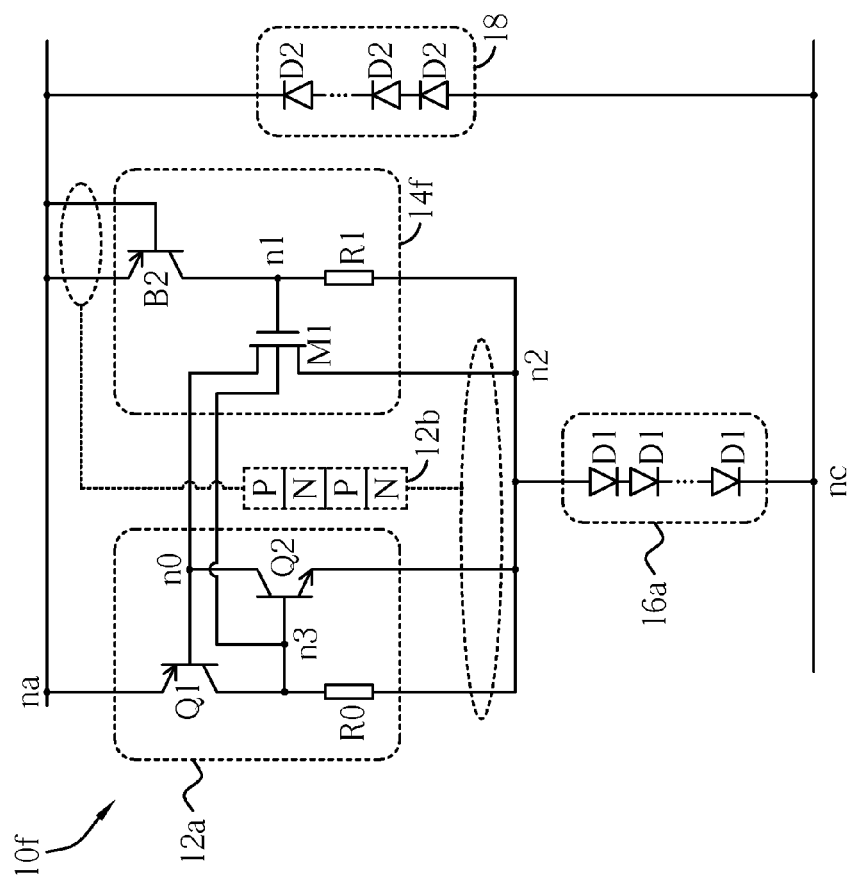

Please refer to FIG. 7 illustrating an ESD protection circuit 10f according to an embodiment of the invention. The ESD protection 10f adopts the SCR 12a, the serial circuits 16a and 18 of the ESD protection circuit 10a, and includes a trigger circuit 14f. The trigger circuit 14f includes transistors M1, B2 and a resistor R1. The transistor M1 can be an N-channel MOS transistor with a drain, a bulk, a gate and a source respectively coupled to the nodes n0, n3, n1 and n2. The transistor B2 can be a PNP bipolar junction transistor with an emitter and a base coupled to the node na and a collector coupled to the node n1. The transistor B2 provides a parasitic capacitor between the nodes na and n1; the transistors M1 and B2 also form another SCR 12b between the nodes na and n2.

When ESD event occurs between the nodes na and nc such that the voltage at the node na rises, the high voltage at the node na is coupled to the node n1 by the capacitor provided by the transistor B2, hence the transistor M1 turns on. The turned-on transistor M1 triggers the SCR 12a, thus the SCRs 12a and 12b together conduct ESD currents from the node na to the node nc.

Figure 8:
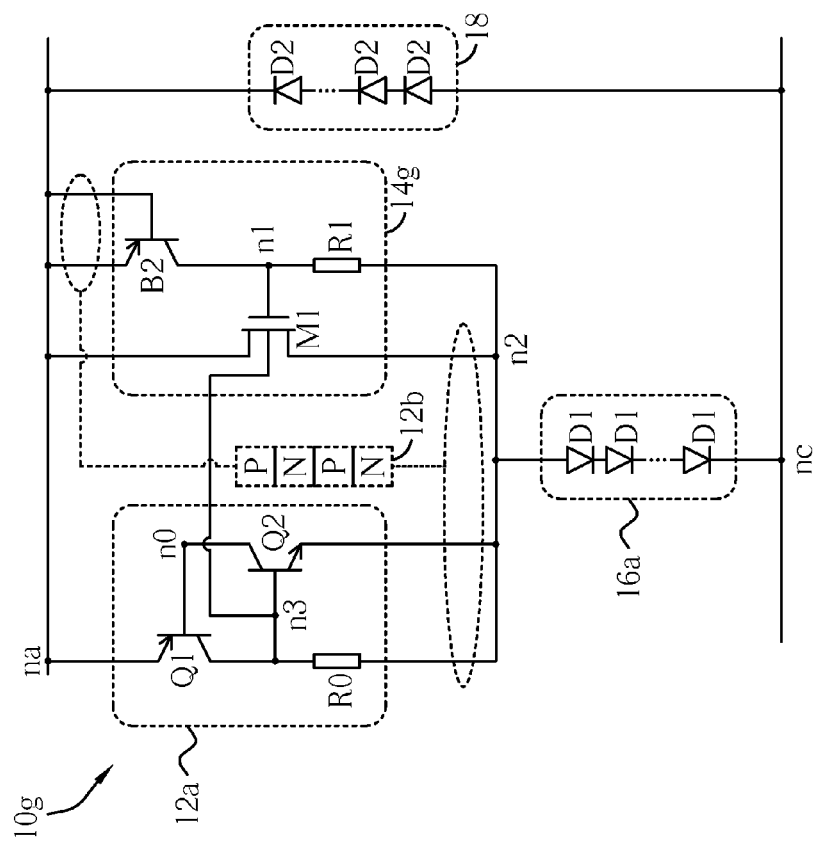

Following the embodiment of FIG. 7, please refer to FIG. 8 illustrating an ESD protection circuit 10g according to an embodiment of the invention. The ESD protection circuit 10g includes an SCR 12a, a trigger circuit 14g and two serial circuits 16a and 18. Similar to the trigger circuit 14f shown in FIG. 7, the trigger circuit 14g also includes transistors M1 and B2, and a resistor R1; a difference is that, a drain of the transistor M1 in coupled to the node na. Operation of the ESD protection circuit 10g is analogous to operation of the ESD protection circuit 10f.

Figure 9:
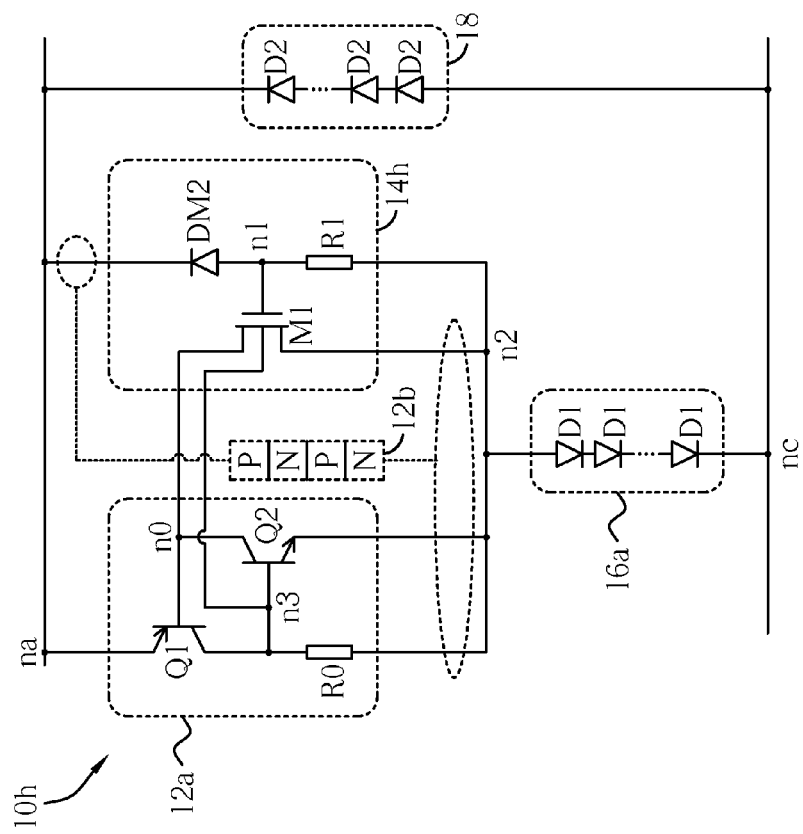

Please refer to FIG. 9 illustrating an ESD protection circuit 10h according to an embodiment of the invention. The ESD protection circuit 10h adopts the SCR 12a and the serial circuits 16a and 18 of the ESD protection circuit 10a, and includes a trigger circuit 14h. The trigger circuit 14h includes a transistor M1, a transistor DM2 and a resistor R1. The transistor M1 can be an N-channel MOS transistor with a drain, a bulk, a gate and a source respectively coupled to the nodes n0, n3, n1 and n2. The transistor DM2 is a diode with a cathode and an anode respectively coupled to the nodes na and n1. The transistor DM2 provides a parasitic capacitor between the nodes na and n1; the transistors M1 and DM2 also form another SCR 12b between the nodes na and n2.

When ESD occurs between the nodes na and nc to cause a rising voltage at the node na, the high voltage at the node na is coupled to the node n1 trough the transistor DM2, so the transistor M1 turns on. The turned-on transistor M1 triggers the SCR 12a, such that the SCRs 12a and 12b cooperate to conduct ESD currents from the node na to the node nc.

In the embodiment of FIG. 9, the drain of the transistor M1 can also be coupled to the node na instead of the node n0.

Figure 10:
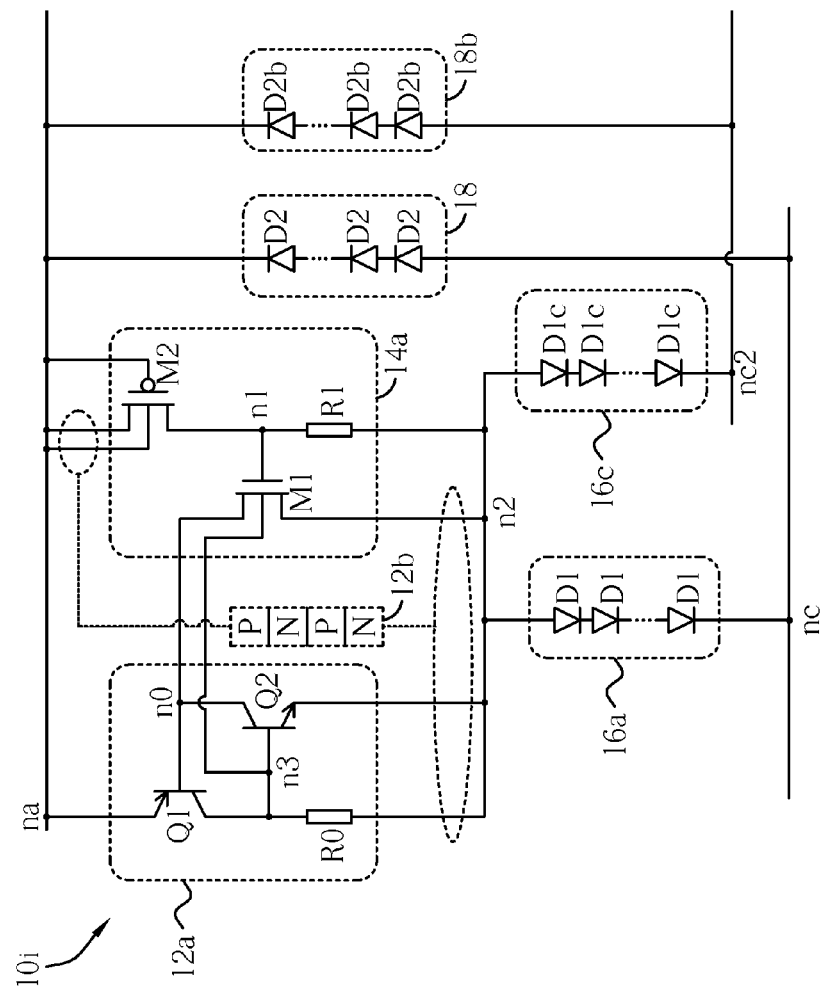

Please refer to FIG. 10 illustrating an ESD protection circuit 10i according to an embodiment of the invention; the ESD protection circuit 10i adopts the SCR 12a, the trigger circuit 14 and the serial circuit 16a and 18 of the ESD protection circuit 10a. The ESD protection circuit 10i further includes a serial circuit 16c and another serial circuit 18b. Two terminals of the serial circuit 16c are coupled between the nodes n2 and nc2; two terminals of the serial circuit 18b are coupled between the nodes na and nc2. The serial circuit 16c can include a predetermined number of diodes D1c, where the predetermined number can be zero, one or more. An anode and a cathode of each diode D1c are respectively coupled between the node n2 and nc2. The serial circuit 18b can include a predetermined number of diodes D2b, wherein the predetermined number can be zero, one or more; an anode and a cathode of each diode D2b are respectively coupled between the node nc2 and na. In the chip equipped with the ESD protection circuit 10i, the node nc and nc2 can be respectively coupled to ground voltages of different power domains, such that the ESD protection circuit 10i can perform ESD protection for different power domains. Different power domains can be domains applying different power voltages and/or different ground voltages within the same chip. The numbers of the diodes of the serial circuits 16 and 16c can be the same or different, each diode D1 and D1c can be matched or different. Similarly, the numbers of the diodes of the serial circuits 18 and 18b can be the same or different, each diode D2 and D2b can be matched or different.

Different but compatible portions shown in FIG. 1 and FIG. 3 to FIG. 10 can be selected and combined to form a coordinated ESD protection solution. For example, in the embodiment of FIG. 3, the drain of the transistor M1 can be coupled to the node na instead of n0, and the transistor M2 can be replaced by the transistor B2 (FIG. 7) or DM2 (FIG. 9).

If a same chip includes multiple ESD protection circuits of the invention (like the ESD protection circuit 10a), the trigger circuits of different ESD protection circuits can be commonly coupled to a same node n2. Or, in each ESD protection circuit, the node n2 of each of the different ESD protection circuits can be mutually isolated.

To sum up, comparing to the prior arts, the ESD protection circuit according to the invention includes the trigger circuit for rapid triggering the SCR when ESD occurs, thus the trigger voltage of the SCR is equivalently reduced. In addition, the trigger circuit itself provides another shunt SCR to enhance conduction capability of ESD current.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrostatic discharge (ESD) protection circuit comprising:
a first silicon controlled rectifier (SCR) having an anode terminal as a first coupling terminal, a second coupling terminal and a control terminal; and
a trigger circuit comprising:
a first metal-oxide-semiconductor (MOS) transistor having a first drain, a first bulk, a first source and a first gate; one of the first drain and the first bulk being coupled to the control terminal, and the first source being coupled to the second coupling terminal; and
a second SCR formed by a portion of the first MOS transistor and one of the following circuits:
a second MOS transistor having a second gate insulated from the first gate, and a second drain coupled to the first gate;
a bipolar junction transistor having a second base, a second emitter directly connected to the second base, and a second collector coupled to the first gate; and
a main diode having a main anode and a main cathode respectively coupled to the first gate and the first coupling terminal.

2. The ESD protection circuit as claimed in claim 1, wherein the second MOS transistor further has a second source directly connected to the second gate.

3. The ESD protection circuit as claimed in claim 1 further comprising:
a serial circuit having a third coupling terminal and a fourth coupling terminal; the third coupling terminal being coupled to the second coupling terminal.

4. The ESD protection circuit as claimed in claim 3, wherein the serial circuit comprising a predetermined number of diodes serially coupled between the third coupling terminal and the fourth coupling terminal.

5. The ESD protection circuit as claimed in claim 3, wherein the serial circuit further has a feedback terminal, and the ESD protection circuit further comprises a feedback circuit coupling between the feedback terminal and the first gate.

6. The ESD protection circuit as claimed in claim 5, wherein the serial circuit comprises a first number of first diodes, a second number of second diodes and a resistor with the first number of first diodes serially coupled between the third coupling terminal and the feedback terminal, and the second number of second diodes and the resistor serially coupled between the feedback terminal and the fourth coupling terminal.

7. The ESD protection circuit as claimed in claim 1 further comprising:
a serial circuit having a third terminal and a fourth terminal; the third terminal being coupled to the first coupling terminal; the serial circuit comprising a plurality of diodes serially coupled between the third terminal and the fourth terminal.

8. The ESD protection circuit as claimed in claim 1, wherein the first drain is coupled to the control terminal.

9. The ESD protection circuit as claimed in claim 1, wherein the first bulk is coupled to the control terminal, and the first drain is coupled to the first coupling terminal.

10. An ESD protection circuit comprising:
a first SCR having a first coupling terminal, a second coupling terminal and a control terminal; and
a trigger circuit comprising:
a first MOS transistor having a first drain, a first bulk, a first source and a first gate; one of the first drain and the first bulk being coupled to the control terminal, and the first source being coupled to the second coupling terminal; and
a bipolar junction transistor having a second base, a second emitter directly connected to the second base, and a second collector coupled to the first gate.

11. An ESD protection circuit comprising:
a first SCR having an anode terminal as a first coupling terminal, a second coupling terminal and a control terminal; and
a trigger circuit comprising:
a first MOS transistor having a first drain, a first bulk, a first source and a first gate; one of the first drain and the first bulk being coupled to the control terminal, and the first source being coupled to the second coupling terminal; and a main diode having a main anode and a main cathode respectively coupled to the first gate and the first coupling terminal.

12. The ESD protection circuit as claimed in claim 1, wherein the trigger circuit further comprises:

a capacitor coupled between the second drain fifth node and the second coupling terminal, and an inverter coupled between the second drain and the first gate.

13. The ESD protection circuit as claimed in claim 12, wherein the trigger circuit further comprises a third transistor coupled between the second coupling terminal and the second gate.

14. The ESD protection circuit as claimed in claim 1 further comprising:

a first serial circuit having a third terminal coupled to the second coupling terminal; the first serial circuit comprising a first number of diodes serially coupled between the third terminal and a fourth terminal; and a second serial circuit having a fifth terminal coupled to the second coupling terminal; the second serial circuit comprising a second number of diodes serially coupled between the fifth terminal and a sixth terminal.

\* \* \* \* \*